United States Patent [19]
Gerszberg et al.

[11] Patent Number: 6,084,583
[45] Date of Patent: Jul. 4, 2000

[54] ADVERTISING SCREEN SAVER

[75] Inventors: Irwin Gerszberg, Kendall Park; Jeffrey S. Martin, Dover, both of N.J.

[73] Assignee: AT&T Corp, New York, N.Y.

[21] Appl. No.: 09/001,574

[22] Filed: Dec. 31, 1997

[51] Int. Cl.[7] .................................................. G06F 13/00
[52] U.S. Cl. ......................... 345/327; 345/330; 345/334; 345/211
[58] Field of Search ..................... 345/327, 329, 345/330, 334, 342; 705/14; 709/232

[56] References Cited

U.S. PATENT DOCUMENTS

| | | |
|---|---|---|
| 4,456,925 | 6/1984 | Skerlos et al. . |
| 4,620,289 | 10/1986 | Chauvel . |
| 4,725,694 | 2/1988 | Auer et al. . |
| 4,916,441 | 4/1990 | Gombrich . |
| 5,014,267 | 5/1991 | Tompkins et al. . |
| 5,105,184 | 4/1992 | Pirani et al. ............................ 340/721 |
| 5,157,717 | 10/1992 | Hitchcock . |
| 5,335,276 | 8/1994 | Thompson et al. . |
| 5,393,964 | 2/1995 | Hamilton et al. . |
| 5,406,615 | 4/1995 | Miller, II et al. . |
| 5,488,412 | 1/1996 | Majeti et al. . |
| 5,512,935 | 4/1996 | Majeti et al. . |
| 5,534,913 | 7/1996 | Majeti et al. . |
| 5,546,316 | 8/1996 | Buckley et al. . |
| 5,561,604 | 10/1996 | Buckley et al. . |
| 5,572,005 | 11/1996 | Hamilton et al. . |
| 5,583,965 | 12/1996 | Douma et al. . |
| 5,584,054 | 12/1996 | Tyneski et al. . |
| 5,587,735 | 12/1996 | Ishida et al. . |
| 5,619,684 | 4/1997 | Goodwin et al. . |
| 5,644,628 | 7/1997 | Schwarzer et al. . |
| 5,671,267 | 9/1997 | August et al. . |
| 5,680,535 | 10/1997 | Harbin et al. ............................ 345/173 |
| 5,682,195 | 10/1997 | Hendricks et al. . |
| 5,684,918 | 11/1997 | Abecassis . |
| 5,740,549 | 4/1998 | Reilly et al. ............................ 705/14 |
| 5,781,894 | 7/1998 | Petrecca et al. ........................ 705/14 |
| 5,819,284 | 10/1998 | Farber et al. ........................... 707/104 |
| 5,864,823 | 1/1999 | Levitan .................................... 705/14 |
| 5,913,040 | 6/1999 | Rakavy et al. .......................... 709/232 |
| 5,946,646 | 8/1999 | Schena et al. .......................... 702/177 |
| 5,949,411 | 9/1999 | Doerr et al. ............................ 345/327 |

*Primary Examiner*—Steven J. Saras
*Assistant Examiner*—Alecia D. Nelson

[57] ABSTRACT

A method for providing for an advertising screen saver is disclosed. At least one video advertisement is stored at a location in a telephone network. If there is no activity at a video telephone with an associated display, a video advertisement is sent to the video telephone. The video advertisement is then displayed on a dark background on the display, wherein the video advertisement is smaller than a display area of the display. The video advertisement is then periodically moved to different locations in the display area.

12 Claims, 10 Drawing Sheets

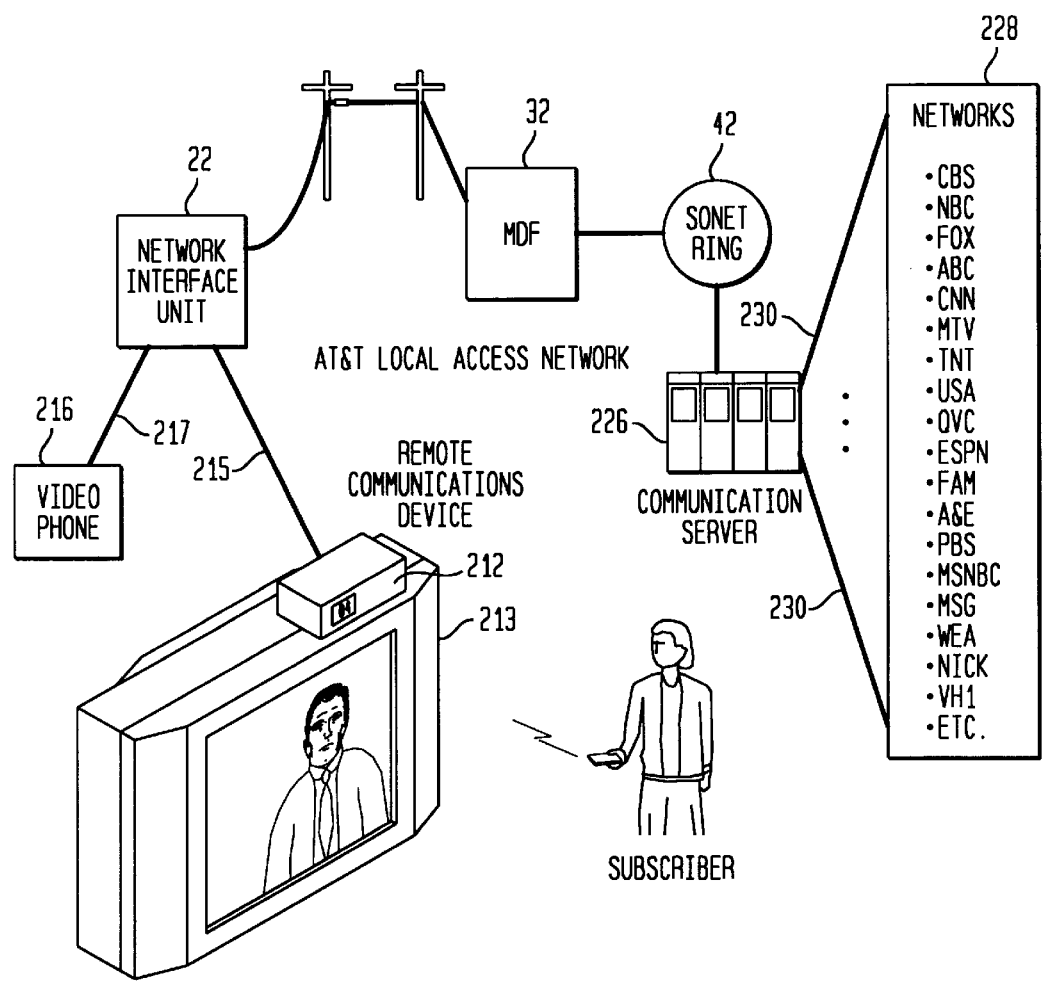

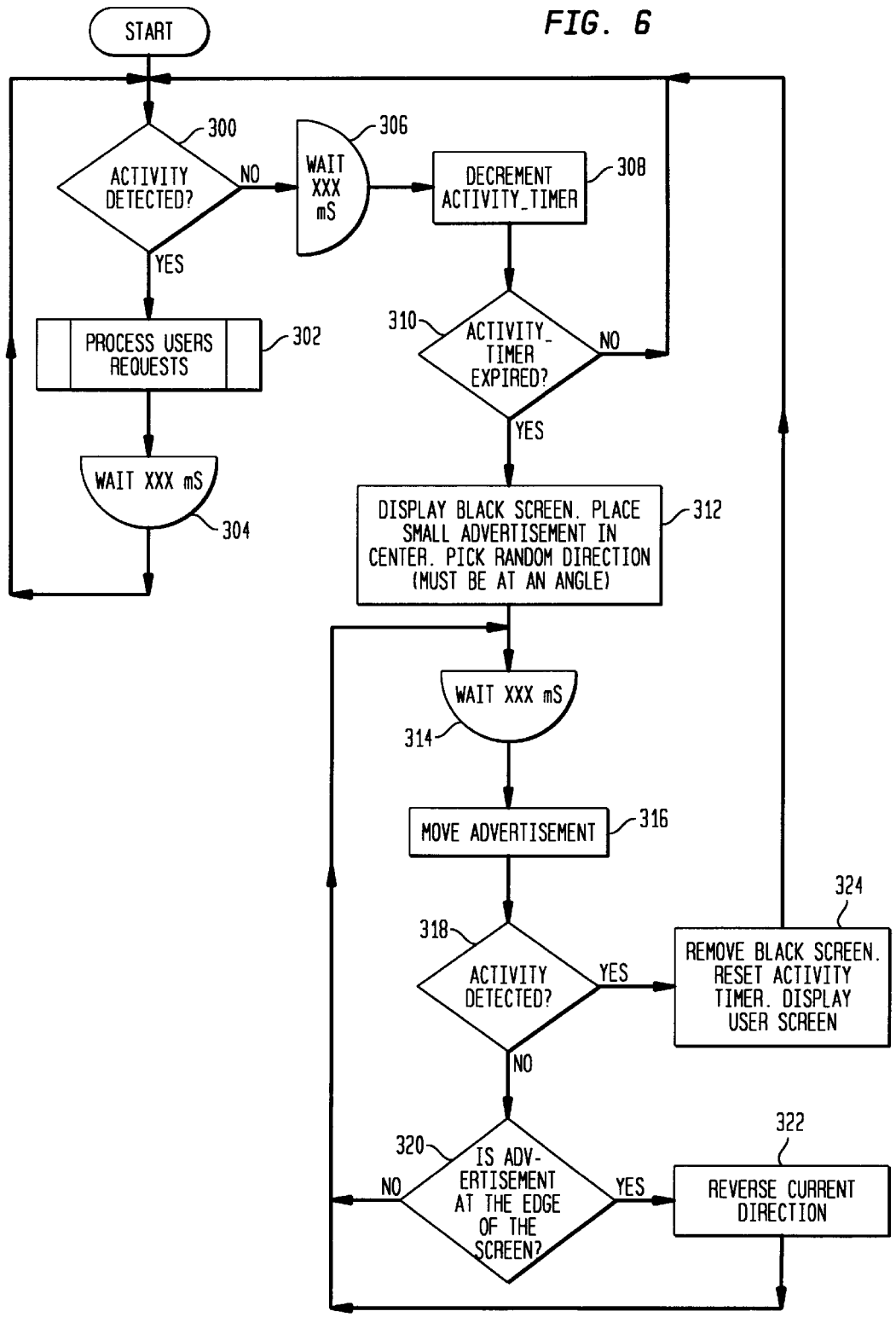

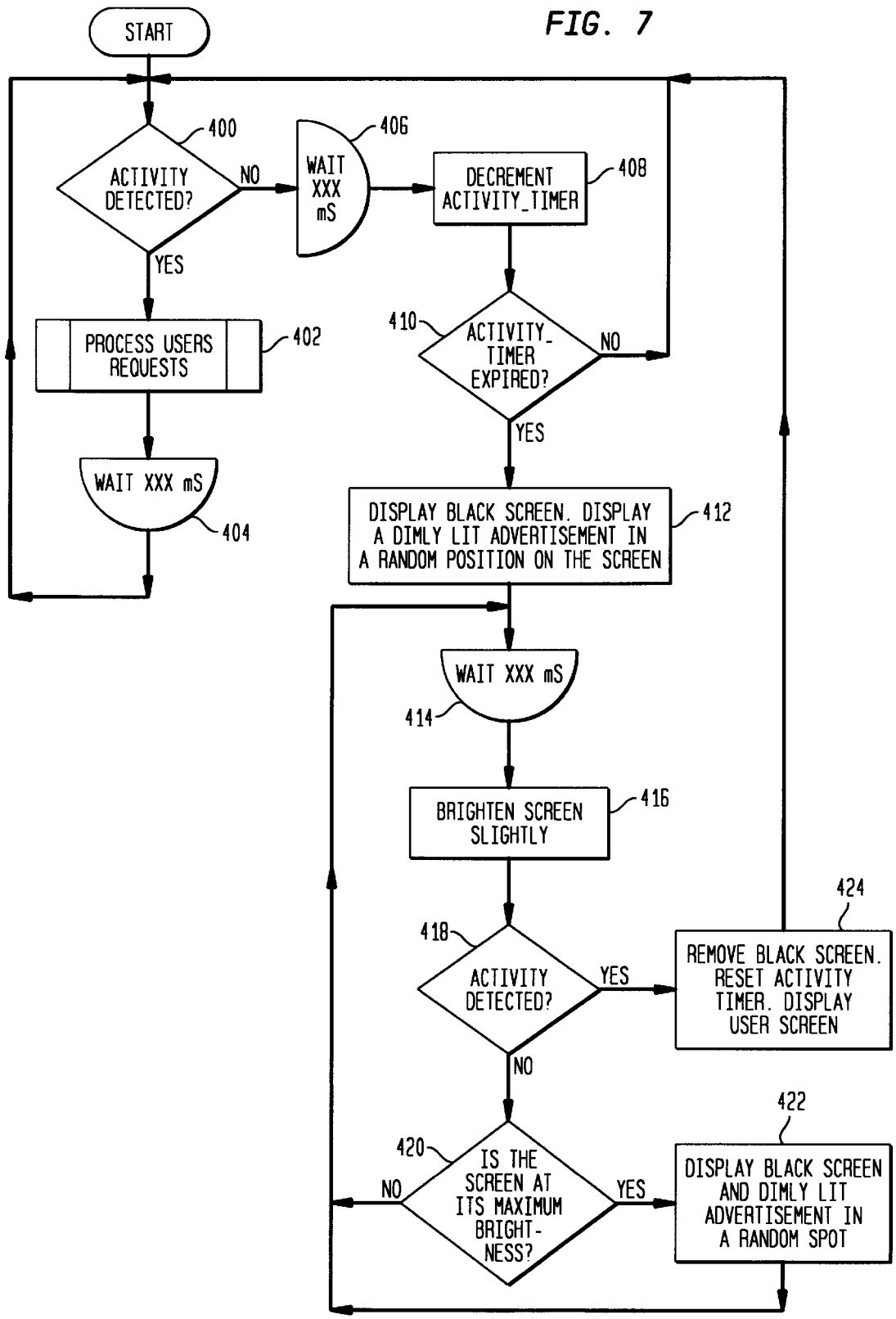

6,084,583

ADVERTISING SCREEN SAVER

TECHNICAL FIELD

This invention relates to consumer appliances, and more particularly, to the use of advertising screen savers to help prevent burnout of a display on the video telephone.

BACKGROUND OF THE INVENTION

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services.

With the emergence of screen based appliances in the home different devices will be required. These devices often incorporate a display screen which can be damaged if left on to constantly display a single immobile image over a period of time. These screens must incorporate some type of screen saver to prevent the display from becoming damaged from constantly showing the same image. The invention provides a method for advertising during the time that a terminal is not in use to prevent damage to the screen.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

The present invention introduces a novel concept for interactive commercials and the use of interactive commercials as a screen saver. The present invention provides a low-cost, efficient solution for protecting the touch screen display of a video telephone from burnout due to the constant display of the same image. Additionally, the present invention provides a cheap medium for advertising while protecting the touch screen displays of video telephones.

According to one embodiment of the present invention, an advertisement is periodically moved about the touch screen display after a predetermined period of time after there is no input activity from the device. The background behind the advertisement is black so that will not affect the screen.

BRIEF DESCRIPTION OF THE DRAWINGS

The novel features of the invention are set out particularly in the appended claims, but the invention will be understood more fully and clearly from the following detailed description of preferred embodiments of the invention as set forth in the accompanying drawings, in which:

FIG. 5 illustrates a telephone network containing a communication server;

FIG. 6 is a flow chart illustrating the operation of one embodiment of the present invention;

FIG. 7 is a flow chart illustrating the operation of one embodiment of the present invention.

DETAILED DESCRIPTION

Figure 1:
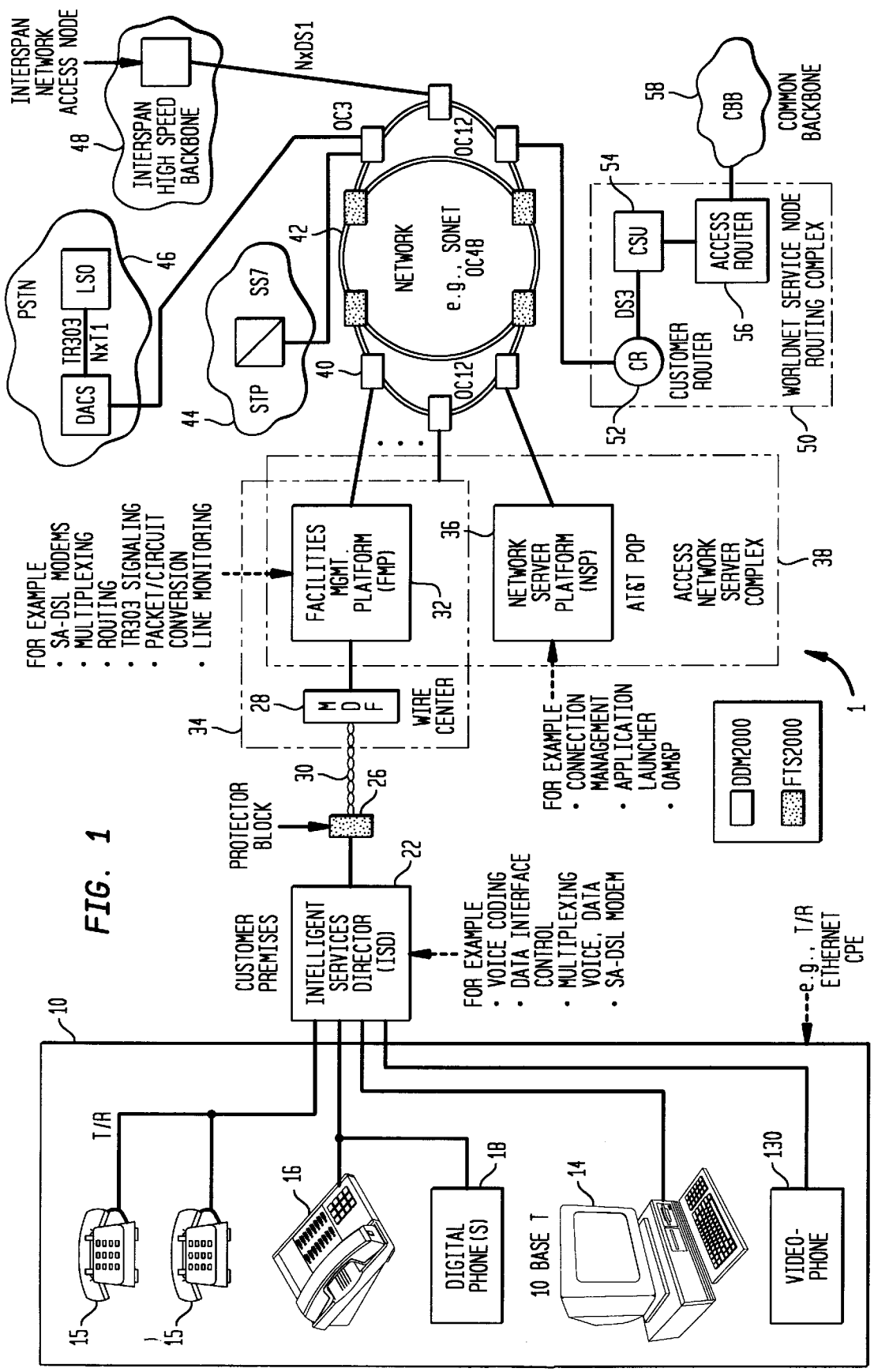
FIG. 1 illustrates an embodiment of a hybrid fiber twisted pair local loop architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FNP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment.

Figure 2:
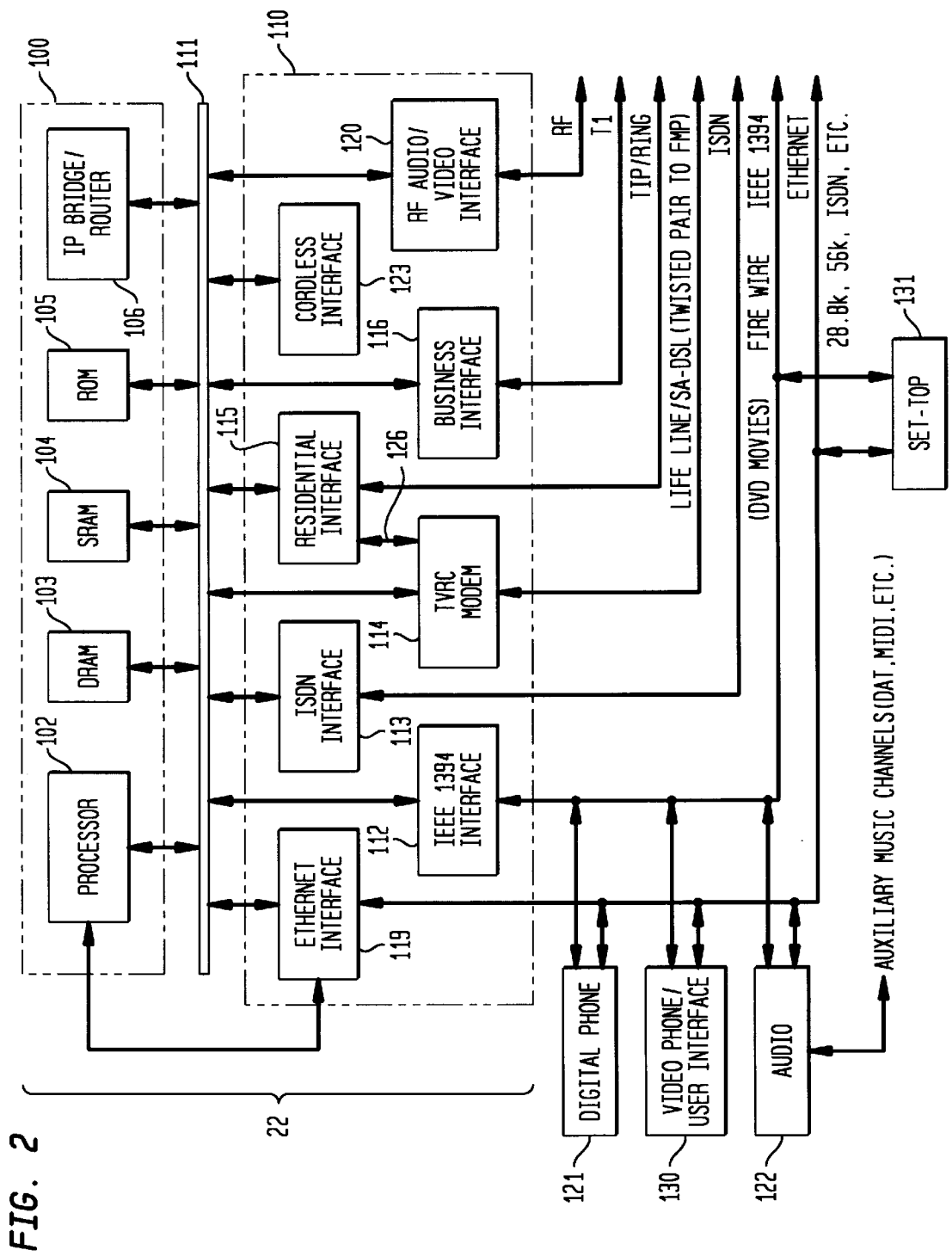
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., for 28.8 kbs data, 56 kbs data, or ISDN), an IEEE 1394 Afire wire@interface 112 (e.g., for a digital videodisc device (DVD)), a TVRC modem interface 114 (e.g., for a digital subscriber line (DSL) modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop device 131.

In further embodiments, the ISD 22 may be configured as an IP proxy server such that each of the devices connected to the server utilizes transmission control protocol/internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing 45 and/or into storage for later viewing.

Figure 3A:
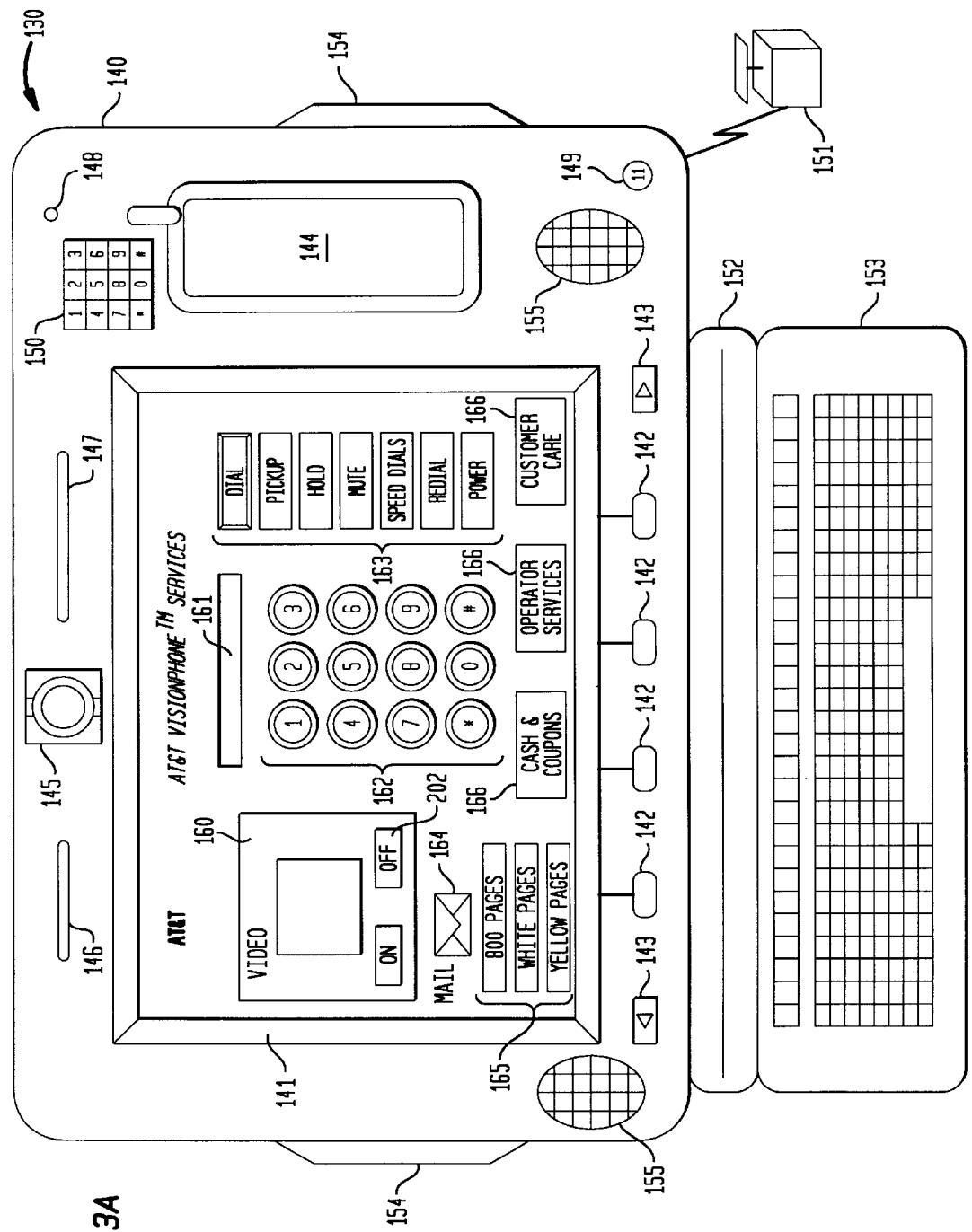
FIGS. 3A and 3B illustrate an embodiment of a video phone consistent with the architecture shown in FIG. 1.
Figure 3B:
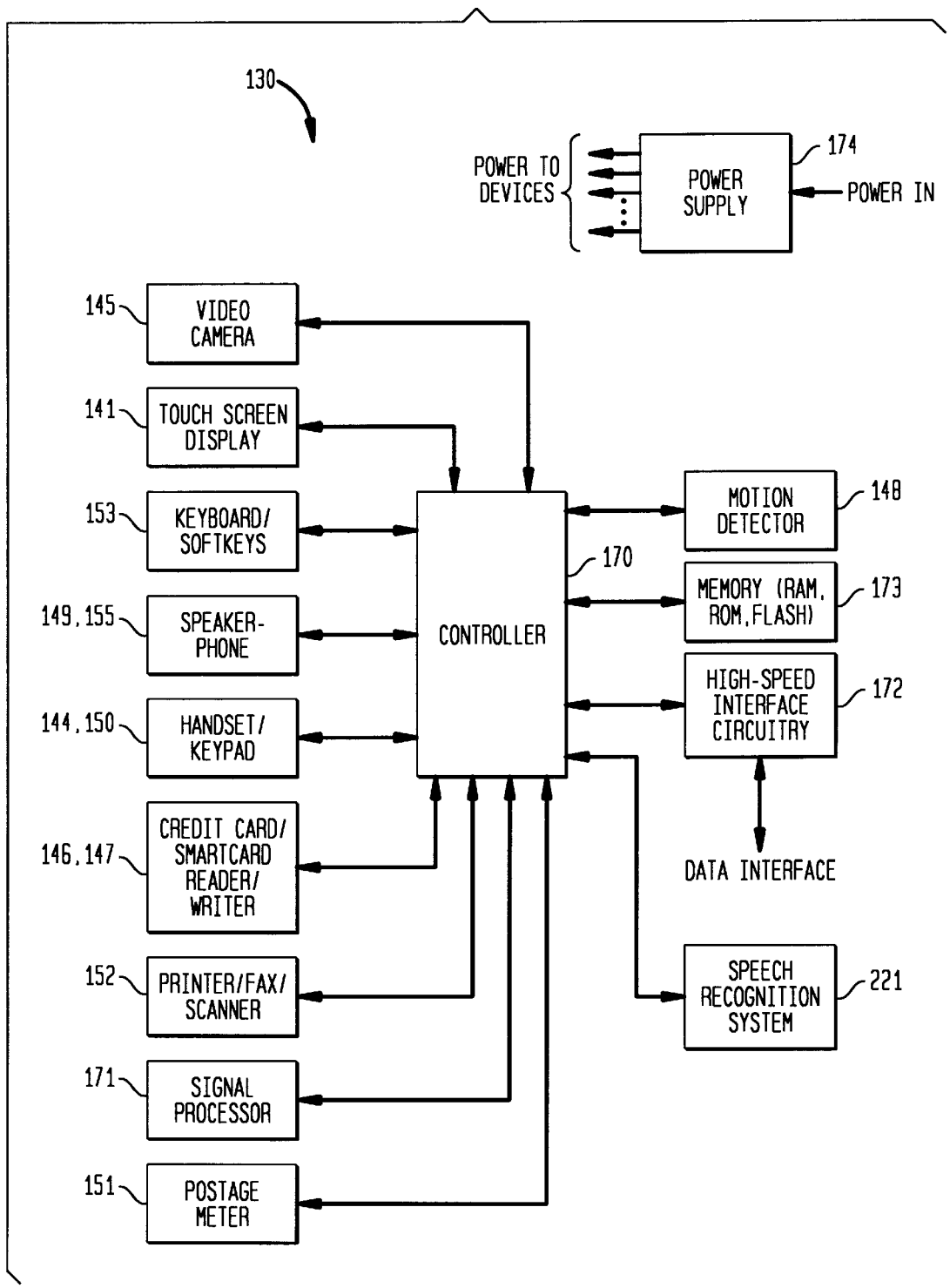

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
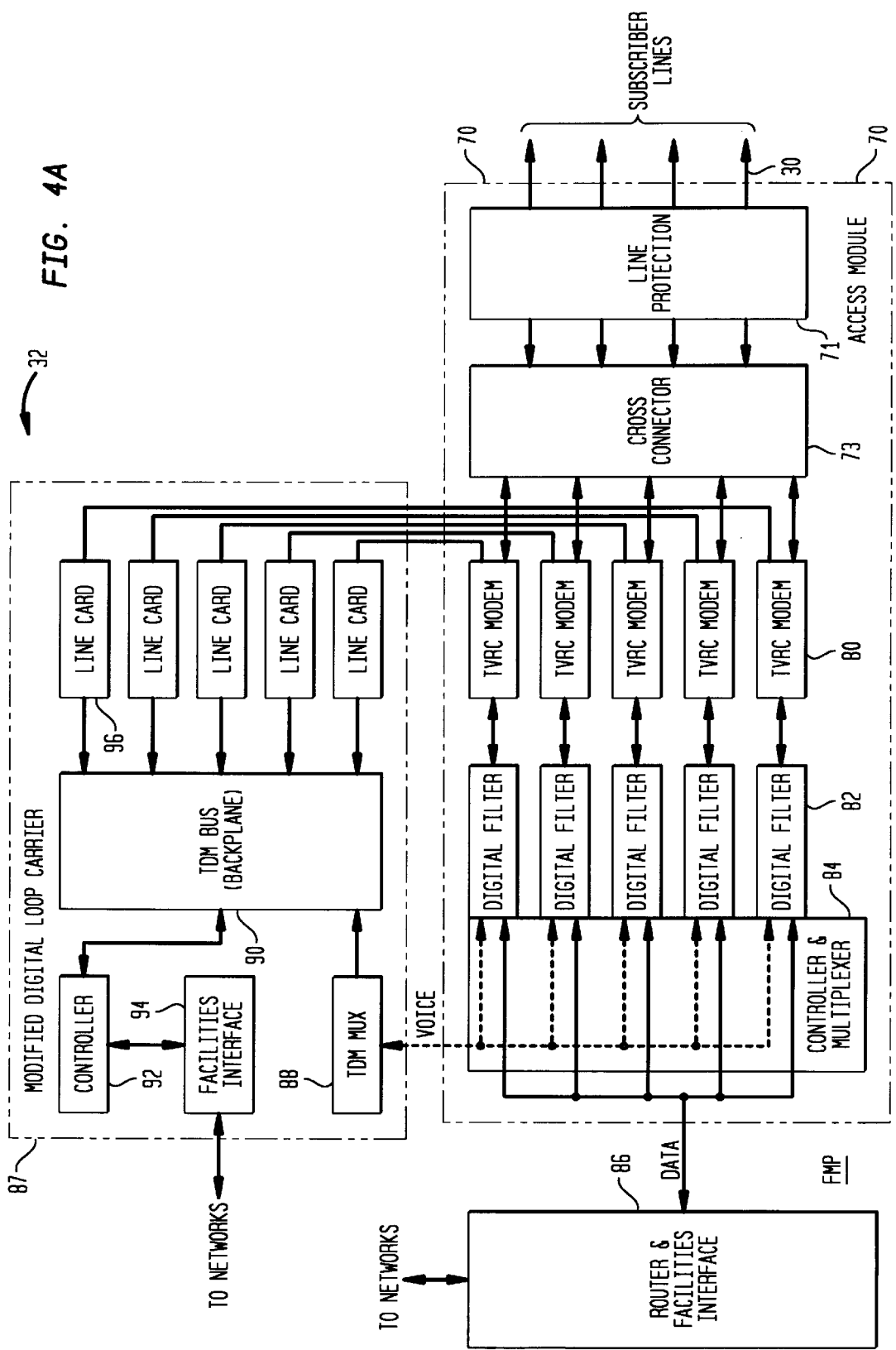
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that are transported across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexer 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
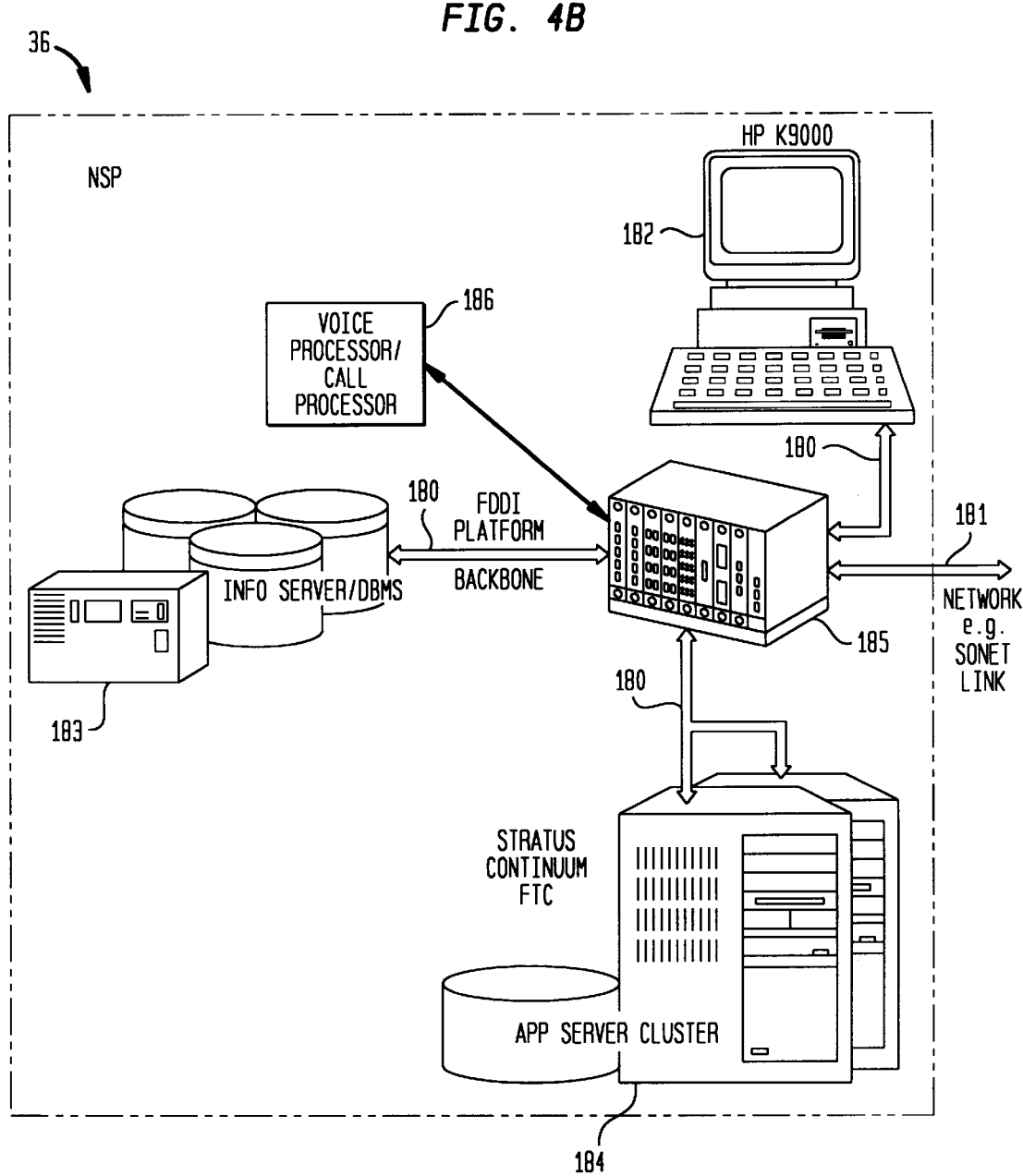
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

FIG. 5 illustrates a telephone network which is configured to include the inventive communication server 226. According to one embodiment, a subscriber unit 212 is provided as a set top device which is attached to a television 213. The set top device 212 is also connected to a phone line 215 and can also be connected to a cable TV, a direct TV satellite, etc. In another embodiment of the present invention, the subscriber unit can be contained within a video telephone 130. A detailed description of a video telephone can be found in U.S. patent application Ser. No. 09/001,905, entitled The Video Phone which is being filed concurrently herewith, and is incorporated herein by reference. The subscriber unit for video telephone 216 is connected to the ISD 22 via a telephone line 215 or 217, respectively. As noted above, the ISD 22 is connected to a facilities management platform 32 via a connection 30. The facilities management platform 32 is connected to a sonet ring 42 to which the communication server 226 is connected. The communication server 226 is interconnected to a plurality of television broadcasting networks 228 where the communication server receives information about the advertisements that are being broadcasted on television stations or receives advertisements form other sources. The connection 230 from the communication server to the television networks can be a low-speed data feed, since only small amounts of data are being transferred. The communication server 226 can also be connected to other advertisers through other data feeds which are not illustrated.

Since the video telephone and the settop devices are designed to be used continuously without being turned off, there is a need to protect the displays on these devices from damage due to burnout.

The present invention provides a method that can prevent damage caused by burnout and at the same time offer an advertising service in the form of a screen saver. The screen saver operation is controlled by either the controller 170 or the central office 34 in the telephone network. When the controller determines that no activity has been detected at the video telephone or the set top device, the necessary functions for activating the screen saver advertising can be activated. The appropriate commercial advertisements are either stored at the central office 34 or are supplied to the central office 34 by the communication server when required. It will be understood that advertisements could also be stored somewhere else in the telephone network and sent to the central office 34 when required. The central office 34 then supplies the controller 170 with the commercial advertisement which is then displayed in a display area in the display 141 in the manner described below.

One embodiment of the present invention will now be described with reference to FIG. 6. In step 300, the controller determines whether there has been any activity detected. No activity can be defined as periods when no motion is detected by the video camera or other motion detection device in the video telephone, no input is detected from the touch sensitive screen display, no input is detected from any other key on the device including the keyboard and or no input from any connected peripheral device, but is not limited thereto. If a user request has been detected in step 300, the controller processes the request in step 302 and an activity timer is set to expire after a predetermined period of time in step 304.

When it is determined that no activity has been detected in step 300, the controller waits a second predetermined period of time in step 306 and then decrements the activity timer in step 308. It is then determined whether the activity timer has expired in step 310. If the activity timer has not expired, then the process returns to step 300.

Figure 8:
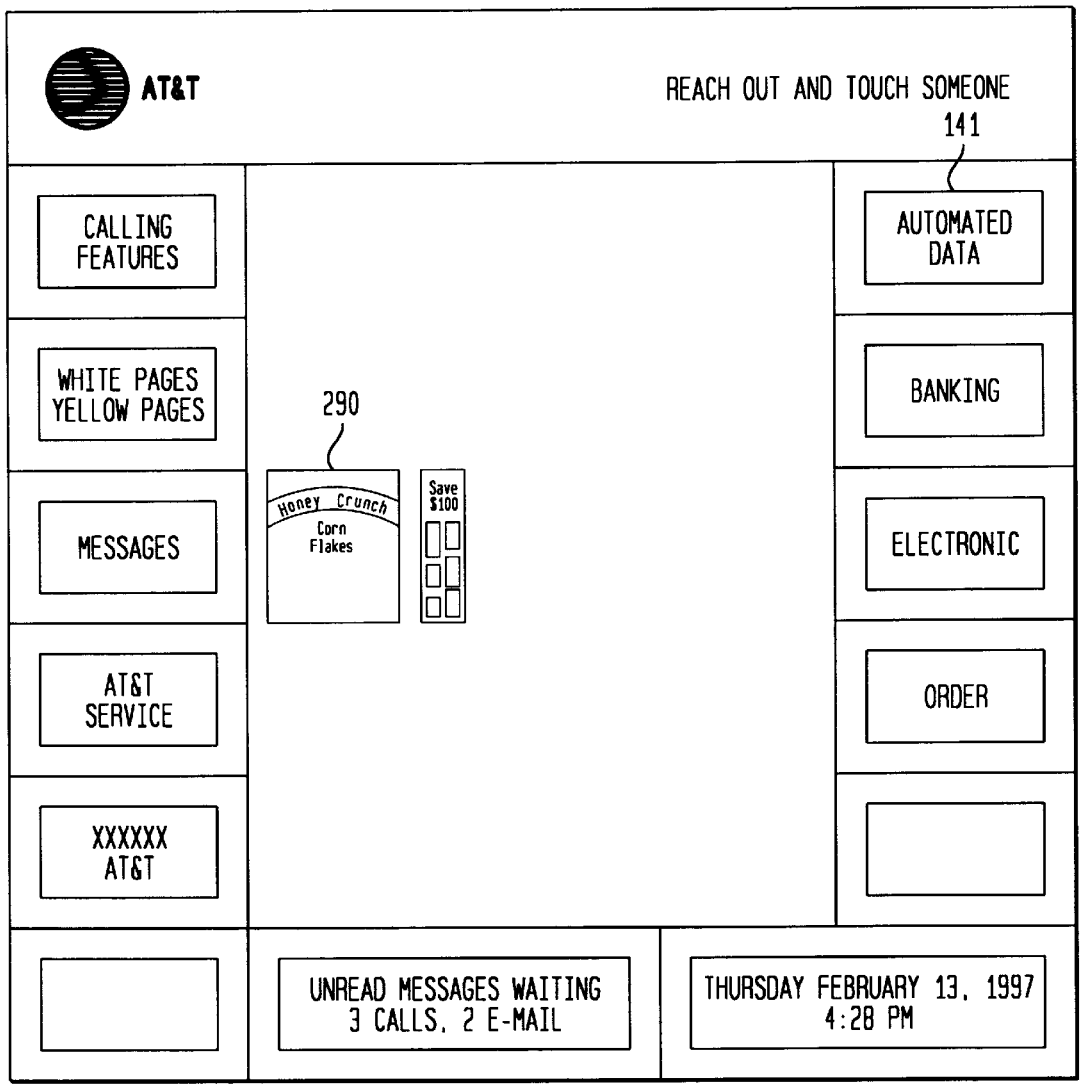
FIG. 8 illustrates an advertising screen saver.

When it is determined that the activity timer has expired, the controller displays a black screen on the touch sensitive display 141. An advertisement is then placed in a section of the display 141, for example, the center of the display. For example, FIG. 8 illustrates an advertisement 290 being displayed in the display 141. The size of the advertisement can vary but the advertisement must be small enough so that as the advertisement moves across the display, as described below, no pixel remains in a constant on state. The controller then waits for a third predetermined period of time in step 314. The controller then picks a random direction, preferably at an angle, to move the advertisement on the display 141 in step 316. The controller then determines whether any activity has been detected by the video telephone in step 318. If activity has been detected, the controller removes the black screen, resets the activity timer and displays a user screen in step 324.

If activity is not detected in step 318, the controller determines whether the advertisement has reached the edge of the display area in step 320. If the advertisement has not reached the edge of the display area, the process returns to step 314. When the advertisement reaches the edge of the display area, the controller reverses the current movement direction in step 322 and then returns to step 314. The present invention can also be configured so that when an advertisement reaches the edge of the display area, a different advertisement then appears on the display 141. In addition, a different advertisement can appear on the display after the present advertisement has been displayed for a predetermined period of time.

Another embodiment of the present invention will now be described with reference to FIG. 7. In step 400, the controller determines whether there has been any activity detected. No activity can be defined as periods when no motion is detected by the video camera or other motion detection device in the video telephone, no input is detected from the touch sensitive screen display, no input is detected from any other key on the device including the keyboard and or no input from any connected peripheral device, but is not limited thereto. If a user request has been detected in step 400, the controller processes the request in step 402 and an activity timer is set to expire after a predetermined period of time in step 404.

When it is determined that no activity has been detected in step 400, the controller waits a second predetermined period of time in step 406 and then decrements the activity timer in step 408. It is then determined whether the activity timer has expired in step 410. If the activity timer has not expired, then the process returns to step 400.

When it is determined that the activity timer has expired, the controller displays a black screen on the touch sensitive display 141 and then displays a dimly lit advertisement in a random position on a portion of the display area of display 141. The controller then waits for a third predetermined period of time in step 414 and then slightly brightens the advertisement in step 416. The controller then determines whether any activity has been detected by the video telephone in step 418. If activity has been detected, the controller removes the black screen, resets the activity timer and displays a user screen in step 424.

If activity is not detected in step 418, the controller determines whether the advertisement has reached its predetermined maximum brightness in step 420. If the advertisement has not reached it maximum brightness, the process returns to step 414. Once the advertisement reaches its maximum brightness, the advertisement disappears and then reappears dimly lit at another random location in the display area in step 422. It will be understood that the operation can also be set up so that when an advertisement reaches its maximum brightness, the advertisement disappears and a different advertisement appears dimly lit at another location in the display area. Alternatively, the advertisement can be changed to a different advertisement after the present advertisement has been displayed for a predetermined period of time.

The following applications are being filed concurrently herewith and are incorporated herein by reference:

1. A Hybrid Fiber Twisted-pair Local Loop Network Service Architecture (Gerszberg 41-3-13);
2. Dynamic Bandwidth Allocation for use in the Hybrid Fiber Twisted-pair Local Loop Network Service Architecture (Gerszberg 42-4-14);
3. The VideoPhone (Gerszberg 43-9-2);
4. VideoPhone Privacy Activator (Gerszberg 44-10-3);
5. VideoPhone Form Factor (Gerszberg 45-11-4);
6. VideoPhone Centrally Controlled User Interface With User Selectable Options (Gerszberg 46-12-5);
7. VideoPhone User Interface Having Multiple Menu Hierarchies (Gerszberg 47-13-6);
8. VideoPhone Blocker (Gerszberg 79-38-26);
9. VideoPhone Inter-com For Extension Phones (Gerszberg 48-14-7);
10. VideoPhone FlexiView Advertising (Gerszberg 49-15-8);
11. VideoPhone Multimedia Announcement Answering Machine (Gerszberg 73-32-20);
12. VideoPhone Multimedia Announcement Message Toolkit (Gerszberg 74-33-21);
13. VideoPhone Multimedia Video Message Reception (Gerszberg 75-34-22);
14. VideoPhone Multimedia Interactive Corporate Menu Answering Machine Announcement (Gerszberg 76-35-23);
15. VideoPhone Multimedia Interactive On-Hold Information Menus (Gerszberg 77-36-24);
16. VideoPhone Advertisement When Calling Video Non-enabled VideoPhone Users (Gerszberg 78-37-25);
17. Motion Detection Advertising (Gerszberg 54-18-10);
18. Interactive Commercials (Gerszberg 55-19);
19. VideoPhone Electronic Catalogue Service (Gerszberg 50-16-9);
20. A Facilities Management Platform For Hybrid Fiber Twisted-pair Local Loop Network, Service Architecture (Barzegar 18-56-17);
21. Multiple Service Access on Single Twisted-pair (Barzegar (16-51-15);
22. Life Line Support for Multiple Service Access on Single Twisted-pair (Barzegar 17-52-16);
23. A Network Server Platform (NSP) For a Hybrid Fiber Twisted-pair (HFTP) Local Loop Network Service Architecture (Gerszberg 57-4-2-2-4);
24. A Communication Server Apparatus For Interactive Commercial Service (Gerszberg 58-20-11);
25. NSP Multicast, PPV Server (Gerszberg 59-21-12);
26. NSP Internet, JAVA Server and VideoPhone Application Server (Gerszberg 60-5-3-22-18);
27. NSP WAN Interconnectivity Services for Corporate Telecommuters (Gerszberg 71-9-7-4-21-6);
28. NSP Telephone Directory White-Yellow Page Services (Gerszberg 61-6-4-23-19);
29. NSP Integrated Billing System For NSP services and Telephone services (Gerszberg 62-7-5-24-20);
30. Network Server Platform/Facility Management Platform Caching Server (Gerszberg 63-8-6-3-5);
31. An Integrated Services Director (ISD) For HFTP Local Loop Network Service Architecture (Gerszberg 72-36-22-12);
32. ISD and VideoPhone Customer Premise Network (Gerszberg 64-25-34-13-5);
33. ISD Wireless Network (Gerszberg 65-26-35-14-6);
34. ISD Controlled Set-Top Box (Gerszberg 66-27-15-7);
35. Integrated Remote Control and Phone (Gerszberg 67-28-16-8);
36. Integrated Remote Control and Phone User Interface (Gerszberg 68-29-17-9);
37. Integrated Remote Control and Phone Form Factor (Gerszberg 69-30-18-10);

38. VideoPhone Mail Machine (Attorney Docket No. 3493.73170);
39. Restaurant Ordering Via VideoPhone (Attorney Docket No. 3493.73171);
40. Ticket Ordering Via VideoPhone (Attorney Docket No. 3493.73712);
41. Multi-Channel Parallel/Serial Concatenated Convolutional Codes And Trellis Coded Modulation Encode/Decoder (Gelblum 4-3);
42. Spread Spectrum Bit Allocation Algorithm (Shively 19-2);
43. Digital Channelizer With Arbitrary Output Frequency (Helms 5-3);
44. Method And Apparatus For Allocating Data Via Discrete Multiple Tones (filed Dec. 22, 1997, Attorney Docket No. 3493.20096—Sankaranarayanan 1—1);
45. Method And Apparatus For Reducing Near-End Cross Talk In Discrete Multi-Tone Modulators/Demodulators (filed Dec. 22, 1997, Attorney Docket No. 3493.37219—Helms 4-32-18).

In addition, the following two patent applications are hereby incorporated by reference:

1. U.S. patent application Ser. No. 08/943,312 filed Oct. 14, 1997 entitled "Wideband Communication System for the Home," to Robert R. Miller, II and Jesse E. Russell, and
2. U.S. patent application Ser. No. 08/858,170, filed May 14, 1997, entitled "Wide Band Transmission Through Wire", to Robert R. Miller, II, Jesse E. Russell and Richard R. Shively.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

What is claimed is:

1. A method for providing for an advertising screen saver, comprising the steps of:

storing at least one video advertisement at a location in a telephone network;

determining if there is no activity at a device with an associated display, said device being attached to said telephone network;

sending said a video advertisement to said device when it is determined that there is no activity at the device;

displaying said video advertisement on a dark background on said display, wherein said video advertisement is smaller than a display area of the display;

first displaying said video advertisement at a low light level;

gradually brighten the video advertisement until the video advertisement reaches a predetermined maximum brightness; and moving said video advertisement to a new location in said display area when said video advertisement reaches the predetermined maximum brightness, wherein said video advertisement is returned to the low light level.

2. The method according to claim 1, wherein said device is a video telephone.

3. The method according to claim 1, wherein said device is a settop device attached to a television.

4. The method according to claim 1, wherein said video advertisement is first displayed at the center of the display area.

5. The method according to claim 4, wherein said video advertisement moves at an angle from each location the video advertisement is displayed.

6. The method according to claim 5, wherein said video advertisement is moved in a reverse direction when the video advertisement hits the edge of the display area.

7. The method according to claim 5, further comprising the steps of:

detecting when said video advertisement hits the edge of the display area;

moving said video advertisement back to the center of the display area; and periodically moving said video advertisement in a random direction.

8. The method according to claim 5, further comprising the steps of:

detecting when said video advertisement hits the edge of the display area;

removing said video advertisement from said display;

sending a new video advertisement to said device; and displaying said new video advertisement on said display.

9. The method according to claim 8, wherein a different advertisement is sent to said device for display when the displayed advertisement hits the edge of the display area.

10. The method according to claim 1, wherein a different video advertisement is sent to said device for display after a predetermined period of time.

11. The method according to claim 1, wherein a different video advertisement is sent to the device for display after a predetermined period of time.

12. The method according to claim 1, wherein a different video advertisement is sent to the device for display when a current video advertisement reaches the maximum brightness.

* * * * *